Aug. 10, 1948.   R. A. CRAWFORD   2,446,811
SELF-SEALING FUEL TANK CONSTRUCTION
Filed March 3, 1943
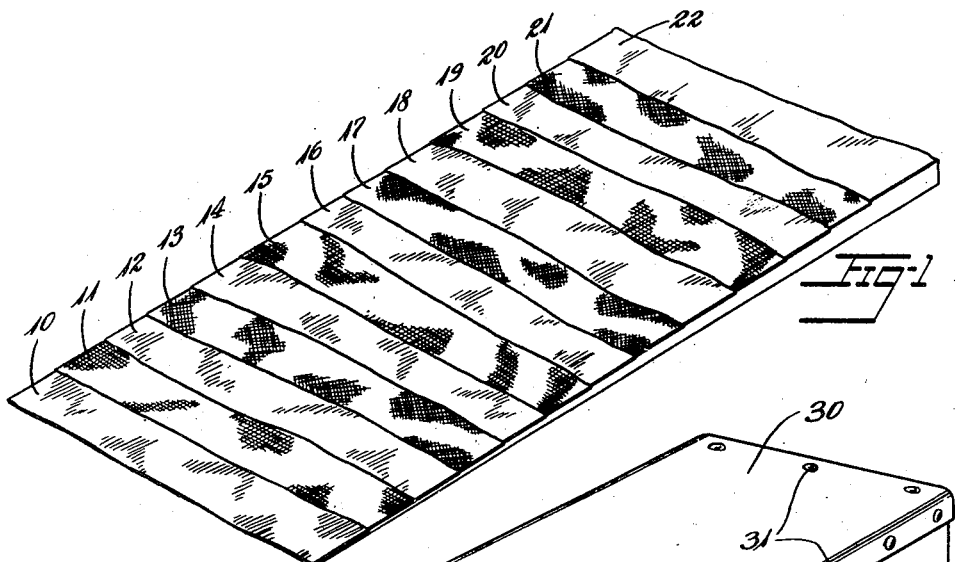
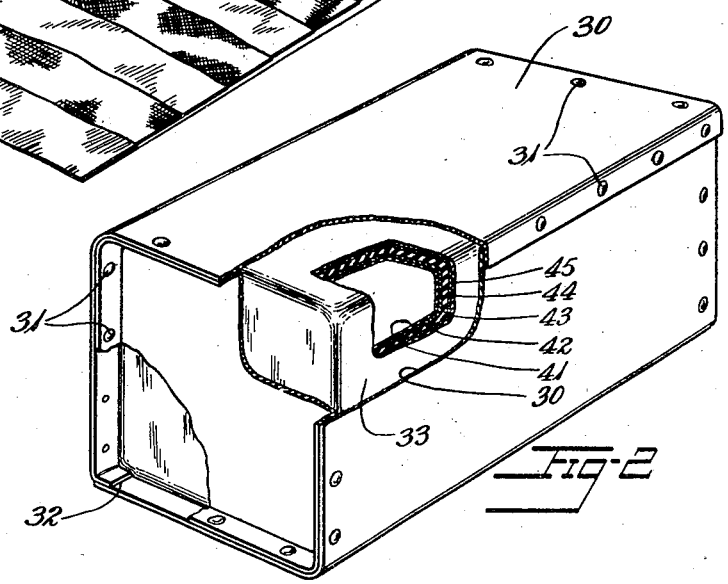
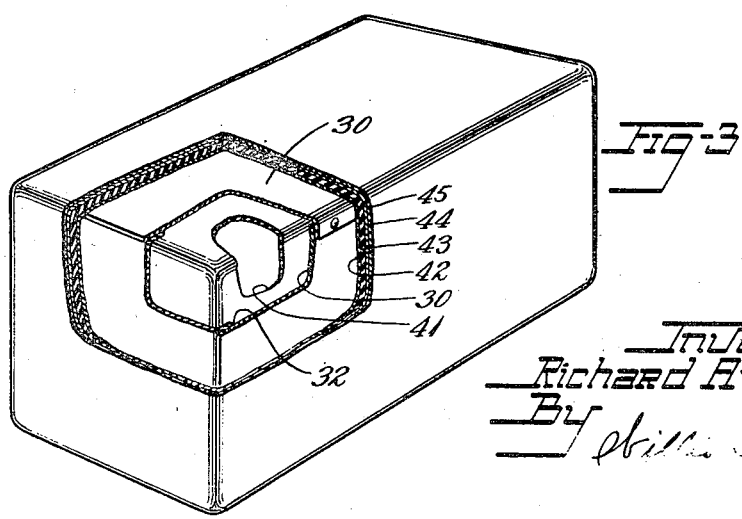
Inventor
Richard A. Crawford
By Patented Aug. 10, 1948

2,446,811

UNITED STATES PATENT OFFICE 2,446,811

SELF-SEALING FUEL TANK CONSTRUCTION

Richard A. Crawford, Akron, Ohio, assignor to The B. F. Goodrich Company, New York, N. Y., a corporation of New York Application March 3, 1943, Serial No. 477,848

6 Claims. (Cl. 154—43.5)

This invention relates to stiff supporting members for gasoline and oil tanks containing a sealing member which serves to prevent leakage of fuel from the tank after puncture of the latter with a projectile.

Such self-sealing tanks in general comprise a gasoline-impervious lining, a resilient sealing member which swells readily when in contact with gasoline, a tear-resistant outer covering, and a stiff supporting member. The inner gasoline-resistant layer may be a foil such as Cellophane or metal foil, or any of the various flexible gasoline-resistant compositions possessing the requisite strength and resiliency, such as polyethylene polysulfide, polyvinyl alcohol plasticized with glycerine or the like, polyvinyl chloride plasticized with gasoline-insoluble materials, neoprene, the super polyamides, or the rubbery copolymers of butadiene with acrylonitrile, etc. The sealing member should possess sufficient strength and resilience to permit yield of the material and recovery after rupture by projectiles without appreciable loss of material; it should swell rapidly when in contact with gasoline, but without dissolving. Among the materials which possess these properties are slightly vulcanized soft rubber, natural or synthetic, including closed-cell sponge rubber; mixtures of rubbery polyisobutylene with rubber or synthetic rubber, the rubber only being vulcanized (for example, mixtures of rubbery polyisobutylene with a copolymer of butadiene and acrylonitrile; mixtures of unvulcanized rubber with a copolymer of butadiene and acrylonitrile; or mixtures of rubber with neoprene in which the neoprene only is vulcanized). The sealing member may be divided into a plurality of layers alternating with sheets of tough, tear-resistant rubbery materials or with sheets of fabric. The outer cover may be made from any tough, tear-resistant material such as fabric, rubber-coated fabric, leather, vulcanized rubber containing reinforcing pigments, or the like.

The stiff supporting member has in the past usually been made of sheet metal or wood. The function of this member is to prevent sagging and distortion of the tank when filled with liquid, and also to prevent excessive distortion of the tank upon impact of the projectile, which results in tearing the sealing member. Without this support, the self-sealing tank is quite flexible or flabby and is unable to retain its shape when filled with liquid. The use of sheet metal or wood for the supporting shell, however, has been found to interfere with satisfactory sealing of the tank after puncture by a projectile. In the case of the metal shell the passage of a projectile therethrough has been found to produce foliation of the metal in the direction of the flight of the projectile. The projecting leaves of metal may hold open the puncture in the self-sealing tank wall and prevent the resilient sealing structure from operating to close the puncture. Similarly, wooden supporting shells splinter badly when penetrated by a projectile, and the splinters may prevent effective sealing of the hole. Other materials, such as vulcanized fiber, which have a sufficiently high modulus of elasticity to serve as a supporting shell, are so brittle that they shatter or crack extensively upon the first impact by a projectile, with a resultant loss of most of their rigidity.

I have now found that an effective supporting member or shell for a self-sealing fuel tank may be made from a laminated structure consisting essentially of alternate layers of strong, resilient fibrous material and layers of an organic stiffening material having a high modulus of elasticity, preferably a heat-hardenable or thermosetting material, all adhered together.

Among the organic stiffening materials which may be used are phenol-formaldehyde type resins, urea-formaldehyde resins, melamine-formaldehyde condensation products, hard alkyd resins, hard rubber (natural or synthetic), methyl methacrylate polymers, polyvinyl alcohol, polyvinyl chloride, polyvinylidene chloride, polyvinyl acetate, cellulose esters and ethers, zein, casein, and other similar natural and synthetic resinous materials.

The layers of fibrous material may consist of such materials as paper, felt, or the like, although it is preferred to use layers of filamentary yarns which may or may not be woven into fabrics. The filaments or fibers which may be used include, among others, those of cotton, wool, linen, silk, glass, cellulose acetate, regenerated cellulose, vinyl resins, superpolyamides, and the like. These yarns may be used in the form of a square woven fabric or knitted fabric, or they may be used in the form of a weftless or weak wefted fabric such as tire cord. The tightness of the weave may be varied over a wide range, with successful results, although best results can usually be secured by taking into consideration the properties of the particular filament or fiber employed, the number of fabric layers, and the relative thickness and properties of layers of organic stiffening material. In general, fabrics ranging from cheesecloth to heavy duck may be successfully employed.

It is important that the layers of fabric and the stiffening material be firmly adhered together. This adhesion is readily secured when the stiffening material is made from a relatively soft composition which hardens or vulcanizes when heated. In that case the stiffening material is merely pressed firmly against the fabric while the laminated structure is being built up, or the stiffening material is applied to the surface of the fabric by means of a calender before the fabric layers are superimposed. The completed structure is then heated until the hardening process or vulcanization is complete. In some cases it is desirable to use an additional cement or adhesive between the fabric and the stiffening materials in a volatile solvent as the adhesive. Indeed, it is sometimes preferable to build up the stiffening layers on the surface of the fabric layers by applying the material in the form of a solution, instead of in the form of a discrete sheet as when a calendering operation is used.

Adjacent layers of fabric in the laminated structure should be crossed for best results; i. e., there should be a substantial angular displacement between the direction of the warp threads in one fabric layer and the direction of the warp threads in the fabric layers on each side. This is particularly true in the case of weftless or weak-wefted cord fabrics, where the angular displacement may be as much as 90°. Although crossing the plies of fabric is not so important with square woven fabrics, superior results may usually be secured by rotating successive plies by amounts ranging from 20° to 90°. It should be noted that the use of square-woven fabric instead of weftless fabric usually results in a shell of greater weight because of the additional stiffening material present in the interstices of the fabric.

The selection of the best fabric-stiffener combination as well as the determination of the optimum thickness for each of the laminations and the total number of laminations depend upon a variety of factors, among the most important of which are the following: size of tank, geometry of tank, vulnerability or probable exposure to gunfire, and character of gunfire. In the case of a shell for large tank the weight of the contents supported by each unit area of the shell wall is greater than in the case of a small tank; the shell wall of the large tank must therefore be stiffer than that of the small one. The geometry of the tank is important because there is formed in front of the projectile during its passage through the liquid contents of the tank a pressure cone. This means that the pressure produced by the passage of a projectile through a wide section of the tank and supporting shell is distributed over a large area, whereas if the projectile passes through a narrow section the pressure is concentrated on a much smaller area. The curvature of the walls also affects the distribution of the forces. The use to which the fuel tank is to be put, i. e. the type of vehicle in which it is to be installed, and its location inside such vehicle, is an important factor in determining the amount of gunfire to which the tank is likely to be exposed and hence the weight of the tank-supporting shell which will be necessary. The type of gunfire to which the tank will be exposed, i. e. the caliber and type of the projectiles, is also a factor in determining just how heavy the tank supporting shell should be.

All of these factors, however, need be taken into consideration only in obtaining optimum effectiveness of the tank-supporting shell. The basic structure in all cases is as described hereinbefore, and only minor modifications are entailed when making adjustments for the foregoing factors. These modifications generally involve only changing the number of laminations in the shell wall to make it heavier or lighter as the case may be.

As a specific example of my invention I shall describe the construction of one of my tank-supporting shells. In the appended drawing Fig. 1 is a perspective of a tank shell wall, broken away to show the laminar construction; Fig. 2 is a perspective of a completed tank, partly broken away to show the sealing member; and Fig. 3 is a similar view of another modification of my invention.

In building the construction of Fig. 1, a 10% solution in methyl ethyl ketone of a copolymer of vinyl chloride and vinylidene chloride which is made from a mixture containing 80% vinyl chloride and 20% vinylidene chloride is prepared. Cheesecloth is dipped in this solution at a temperature of about 70° to 80° F. and allowed to dry for about two hours at room temperature. Two brush coats of a 15% solution of the same copolymer are then applied to each side, allowing the first coat to dry before applying the second. While the second coat is still tacky the coated cheesecloth is then laid on a second sheet of cheesecloth similarly treated, the threads of the second sheet crossing those of the first at an angle of about 45°, and the process is repeated until a total of six plies is built up as shown in Fig. 1, in which layers 11, 13, 15, 17, 19 and 21 of cheesecloth alternate with layers 10, 12, 14, 16, 18, 20, and 22 of the polymer. The laminated structure is then allowed to dry at room temperature for twelve to sixteen hours. The structure is then placed in a press and heated at about 280° to 320° F. for about five minutes under a pressure of about 100 lb. per sq. in. The resulting flat sheet, after removal from the press, may be formed into the desired shape before cooling, or it may be subsequently heated and shaped.

In Fig. 2, in which the walls 30 of the shell have the laminated construction shown in Fig. 1, two modes of fastening the walls together are shown. The edges of the walls may be lapped and fastened together with rivets 31 or they may be sealed together by the application of heat and pressure as at joint 32. Into the container constructed as described above is fitted a self-sealing tank 33 of conventional construction. The lining 41, about .025" thick, is a sheet of butadiene-acrylonitrile copolymer. The adjacent layer 42 consists of square woven 14 oz. cotton duck (23 ends per inch) frictioned and coated on the side next to the lining 41 with neoprene, and frictioned and coated on the other side with rubber to a total thickness of about .05 inch. The sealant layer 43, about .25 inch thick, is composed of a mixture of about 75 parts of rubber, 25 parts of reclaimed rubber, 5 parts of magnesium oxide, and 1 part of sulfur. Outside the sealant layer is a layer of rayon cord fabric (weighing .09 lb./sq. ft. and having 22 ends per inch of cord .032 inch in diameter), 44, frictioned and coated with rubber on both sides. The outer ply 45 is identical with layer 44, the cords of the two layers being crossed at an angle of 45°. The two outer layers 44 and 45 have a total thickness of about 0.10 inch. The self-sealing tank above described, provided with suitable fittings for inlet and outlet pipes, is vulcanized before it is placed inside the tank shell of my invention. Although the self-sealing tank may be fastened to the inside of the shell, for example by means of a suitable adhesive, this feature is not essential.

After the self-sealing tank has been placed inside the shell, the opening remaining in the shell is sealed by riveting or heat-sealing a section of the laminated structure shown in Fig. 1 over the opening.

Such a combination of tank and shell may be filled with gasoline or oil without substantially distorting its shape. When subjected to the fire of 50 caliber bullets the supporting shell does not flare or foliate as does a metal shell of similar structural strength, nor does it show extensive cracking, as, for example, is shown by a sheet or board of vulcanized fiber under the same conditions. To the contrary, my new supporting shell retains its original stiffness to a remarkable extent even after penetration by several bullets.

It will be understood that, although I have described a specific example of my supporting shells in considerable detail, substantially the same results may be obtained with many minor variations in the method of construction. For example, instead of applying the resinous material to the fabric by brushing on a solution of the resin, a sheet or film of the resin may be laid on the dipped fabric. After heating in a press a laminated structure such as the one first described results. Similarly, if a heavier fabric is used, the resinous material may be applied to the dipped fabric by means of a calendering operation. In general, however, it is preferred that the supporting shell member be substantially coextensive in area with the sealing member, or at least with a major portion of the sealing member, in order to prevent distortion of the latter by internal pressures.

Another modification of my invention is shown in Fig. 3, in which the supporting shell 30, constructed as described in the previous example, is placed inside the self-sealing member instead of outside. In this case the gasoline-resistant lining 41 is placed inside the shell 30, and the remainder of the self-sealing tank, plies 42, 43, 44, and 45, is placed outside the shell.

If desired, the supporting shell may be built up together with the self-sealing portion of the tank on the same building form. In that case the heating period used to vulcanize the vulcanizable portions of the self-sealing structure serves also to dry the solvent out of the laminated shell.

Not only the vinyl copolymers may be used in constructing my new supporting shell, but also other natural or synthetic resinous materials, as has been described.

In this connection, it should be noted that certain fabrics, particularly those made of rayon, tend to deteriorate in the presence of acids. Since many of the phenol-formaldehyde and urea-formaldehyde type resins contain appreciable quantities of an acidic condensation catalyst, it is preferable to employ fabrics or yarns woven from glass, cotton, or other acid-resistant filaments in conjunction with these resinous materials. Resins which are water-soluble, such as the phenol-formaldehyde or urea-formaldehyde type resins, may generally be applied to the surface of the fabric in the form of an aqueous solution. Heating the laminated structure drives off the water and completes the condensation of the resin to a hard solid.

Emulsions of the resinous materials may also be used in constructing the tank shell; for example, rubber latex containing suitable amounts of sulfur to produce a hard rubber after vulcanization and other compounding ingredients may be applied to the fabric by dipping, spraying, or brushing.

I claim:

1. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member substantially coextensive in area with said lining and said sealing layer comprising a plurality of layers of fibrous material interspersed between and adhered to layers of hard resinous material, said supporting member having sufficient stiffness to prevent substantial sagging and distortion of said tank when filled with fuel and being substantially free of any tendency to foliate upon penetration by a projectile; said lining, sealing layer, and supporting member all being adhered together.

2. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of layers of filamentary yarns interspersed between and adhered to layers of hard resinous material, said supporting member having sufficient stiffness to prevent substantial sagging and distortion of said tank when filled with fuel and being substantially free of any tendency to foliate upon penetration by a projectile.

3. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of layers of filamentary yarns interspersed between and adhered to layers of hard resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together.

4. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer comprising a plurality of layers of cotton fabric interspersed between and adhered to layers of thermoset hard resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together.

5. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer consisting of a plurality of cross-plied layers of cotton fabric interspersed between and adhered to layers of thermoset hard resinous material, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together throughout their extent.

6. A self-sealing fuel tank adapted to seal punctures therein caused by projectiles which comprises in combination a gasoline-resistant flexible lining, a rubbery sealing layer which swells rapidly but does not dissolve in gasoline, and a non-metallic non-shattering stiff supporting member therefor substantially coextensive in area with said lining and sealing layer consisting of a plurality of cross-plied layers of cotton fabric interspersed between and adhered to layers of thermoset urea-formaldehyde resin, said supporting member being outside said sealing layer and having sufficient stiffness to prevent substantial sagging and distortion of said tank when filled with fuel and being substantially free of any tendency to foliate upon penetration by a projectile; said lining, sealing layer, and supporting member all being adhered together throughout their extent.

RICHARD A. CRAWFORD.

REFERENCES CITED

The following references are of record in the file of this patent:

UNITED STATES PATENTS

| Number | Name | Date |
| --- | --- | --- |
| 1,297,305 | Thacher | Mar. 11, 1919 |
| 1,931,922 | Damsel | Oct. 24, 1933 |
| 2,112,544 | Rice | Mar. 29, 1938 |
| 2,128,097 | Mains | Aug. 23, 1938 |
| 2,160,371 | Schnabel | May 30, 1939 |